(12) United States Patent
Guo et al.

(10) Patent No.: US 11,334,698 B2
(45) Date of Patent: May 17, 2022

(54) CELL-AWARE DEFECT CHARACTERIZATION BY CONSIDERING INTER-CELL TIMING

(71) Applicant: Synopsys, Inc., Mountain View, CA (US)

(72) Inventors: Ruifeng Guo, Mountain View, CA (US); Emil Gizdarski, Mountain View, CA (US); Xiaolei Cai, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/244,126

(22) Filed: Apr. 29, 2021

(65) Prior Publication Data

US 2021/0342511 A1 Nov. 4, 2021

Related U.S. Application Data

(60) Provisional application No. 63/017,534, filed on Apr. 29, 2020.

(51) Int. Cl.
| | |
|---|---|
| *G06F 30/3312* | (2020.01) |
| *G06F 30/333* | (2020.01) |
| *G06F 30/3308* | (2020.01) |
| *G06F 30/398* | (2020.01) |
| *G06F 30/20* | (2020.01) |
| *G06F 119/02* | (2020.01) |

(52) U.S. Cl.
CPC ........ *G06F 30/3312* (2020.01); *G06F 30/333* (2020.01); *G06F 30/20* (2020.01); *G06F 30/3308* (2020.01); *G06F 30/398* (2020.01); *G06F 2119/02* (2020.01)

(58) Field of Classification Search
CPC .... G06F 30/20; G06F 30/3312; G06F 30/333; G06F 30/3308; G06F 30/398; G06F 2119/02
USPC ........................... 716/106, 112, 136; 703/16
See application file for complete search history.

(56) References Cited

U.S. PATENT DOCUMENTS

| | | | | |
|---|---|---|---|---|
| 5,293,327 | A * | 3/1994 | Ikeda ...................... | G06F 30/33 703/19 |
| 5,625,803 | A * | 4/1997 | McNelly ................. | G06F 30/33 703/14 |
| 5,838,947 | A * | 11/1998 | Sarin ...................... | G06F 30/33 703/14 |

(Continued)

*Primary Examiner* — Phallaka Kik
(74) *Attorney, Agent, or Firm* — Jaquez Land Greenhaus & McFarland LLP; Bruce W. Greenhaus, Esq.

(57) ABSTRACT

Disclosed is cell-aware defect characterization by considering inter-cell timing. Also disclosed is a method and apparatus that determines whether a defect can be detected in a standard library cell used to design an integrated circuit. A defect detection table is generated that indicates whether particular defects can be detected with particular combinations of input logic states and under varying load conditions. Results are merged to provide a single metric for each combination of input and output logic states that indicates one of three possible results for each defect: (1) whether the defect can be detected under all load conditions, (2) whether the defect can be detected only under some load conditions; or (3) whether the defect cannot be detected for the particular combination of input logic states regardless of the load conditions.

20 Claims, 9 Drawing Sheets

(56) References Cited

U.S. PATENT DOCUMENTS

| | | | | |
|---|---|---|---|---|
| 5,903,468 A * | 5/1999 | Misheloff | ............... | G06F 30/33 703/16 |
| 6,467,068 B1 * | 10/2002 | Iyer | ............... | G06F 30/30 716/102 |
| 6,505,332 B1 * | 1/2003 | Oda | ............... | G06F 30/39 716/113 |
| 6,591,407 B1 * | 7/2003 | Kaufman | ............... | G06F 30/39 716/114 |
| 6,629,301 B1 * | 9/2003 | Sutherland | ............... | G06F 30/327 716/123 |
| 6,751,579 B1 * | 6/2004 | Misheloff | ............... | G06F 30/33 703/2 |
| 7,412,616 B2 * | 8/2008 | Matsui | ............... | G06F 13/4243 713/401 |
| 7,818,602 B2 * | 10/2010 | Kajihara | ............... | G06F 1/3203 713/500 |
| 7,992,027 B2 * | 8/2011 | Suzuki | ............... | H02J 1/001 713/330 |
| 8,302,046 B1 * | 10/2012 | Keller | ............... | G06F 30/3312 716/108 |
| 8,441,326 B1 * | 5/2013 | Bromberger | ............... | H03F 3/60 333/32 |
| 8,443,313 B2 * | 5/2013 | Ward | ............... | G06F 30/327 716/104 |
| 8,478,576 B1 * | 7/2013 | Cameron | ............... | G06F 30/367 703/14 |
| 8,527,257 B2 * | 9/2013 | Reddy | ............... | G06F 30/367 703/15 |
| 8,813,006 B1 * | 8/2014 | Parameswaran | ............... | G06F 30/398 716/106 |
| 9,047,426 B2 * | 6/2015 | Mottaez | ............... | G06F 30/30 |
| 10,311,200 B2 * | 6/2019 | Moroz | ............... | G06F 30/367 |
| 10,346,569 B2 * | 7/2019 | Allen | ............... | G06F 30/327 |
| 11,017,135 B2 * | 5/2021 | Vaidyanathan | ............... | G01R 31/3177 |

* cited by examiner

STATIC DEFECT DETECTION TABLE

300

| A0 | A1 | B0 | B1 | OUTPUT | D1 | D3 | D4 | D5 | D7 |
|---|---|---|---|---|---|---|---|---|---|
| 0 | 0 | 0 | 1 | 0 | 0 | 0 | 0 | 1 | 1 |
| 0 | 0 | 1 | 0 | 1 | 0 | 0 | 1 | 0 | 0 |
| 0 | 0 | 1 | 1 | 0 | 0 | 0 | 1 | 1 | 1 |
| 0 | 1 | 0 | 0 | 1 | 0 | 1 | 0 | 0 | 0 |
| 0 | 1 | 0 | 1 | 0 | 0 | 1 | 0 | 1 | 1 |
| 0 | 1 | 1 | 0 | 1 | 0 | 1 | 1 | 0 | 0 |
| 1 | 0 | 0 | 1 | 0 | 1 | 0 | 0 | 1 | 1 |
| 1 | 0 | 0 | 1 | 1 | 1 | 0 | 0 | 1 | 1 |
| 0 | 0 | 0 | 1 | 0 | 0 | 0 | 0 | 1 | 1 |
| 0 | 1 | 0 | 1 | 1 | 0 | 1 | 0 | 1 | 1 |
| 1 | 1 | 0 | 1 | 0 | 1 | 1 | 0 | 1 | 1 |

FIG. 3

DYNAMIC DEFECT DETECTION TABLE

400

| A0 | A1 | B0 | B1 | OUTPUT | D2 | D6 | D8 |
|----|----|----|----|--------|----|----|----|
| 0  | 0  | 0  | R  | R      | 0  | 0  | 0  |
| 0  | 0  | R  | 0  | 1      | 0  | 0  | 1  |
| 0  | 0  | R  | R  | 0      | 0  | 0  | 1  |
| 0  | F  | 0  | 0  | F      | 0  | 1  | 0  |
| 0  | F  | 0  | F  | F      | 0  | 1  | 0  |
| 0  | R  | F  | 0  | 1      | 0  | 1  | 1  |
| R  | 0  | 0  | F  | 0      | 1  | 0  | 0  |
| F  | 0  | 0  | R  | 1      | 1  | 0  | 0  |
| 0  | 0  | 0  | F  | 0      | 0  | 0  | 0  |
| 0  | R  | 0  | R  | R      | 0  | 1  | 0  |
| R  | F  | 0  | R  | 0      | 1  | 1  | 0  |

DYNAMIC DEFECT DETECTION TABLE

| A0 | A1 | B0 | B1 | OUTPUT | D2 | D6 | D8 |
|---|---|---|---|---|---|---|---|
| 0 | 0 | 0 | R | 0 | 0 | x | x |
| 0 | 0 | R | 0 | 1 | x | x | 0 |
| 0 | 0 | R | R | 0 | 0 | 0 | 1 |
| 0 | F | 0 | 0 | 1 | 0 | x | 0 |
| 0 | F | 0 | F | 0 | 0 | 1 | 0 |
| 0 | R | F | 0 | 1 | x | 1 | 1 |
| R | 0 | 0 | R | 0 | x | x | 0 |
| F | 0 | 0 | R | 1 | 1 | x | 0 |
| 0 | 0 | 0 | F | 0 | 0 | 0 | x |
| 0 | R | 0 | R | 1 | 0 | x | x |
| R | F | 0 | R | 0 | 1 | 1 | x |

FIG. 5

DYNAMIC DEFECT DETECTION RECORD

| | A0 | ARC-A0 | A1 | ARC-A1 | B0 | ARC-B0 | B1 | ARC-B1 | OUTPUT | OUTPUT-ARC | D2 | D6 | D8 |
|---|---|---|---|---|---|---|---|---|---|---|---|---|---|
| 607a | 0 | 1 | 0 | 1 | 0 | 1 | R | 1 | 0 | 1 | 0 | 0 | 0 |
| 607b | 0 | 2 | 0 | 1 | 0 | 1 | R | 1 | 0 | 1 | 0 | 0 | 1 |
| 607c | 0 | 3 | 0 | 1 | 0 | 1 | R | 1 | 0 | 1 | 0 | 0 | 1 |
| 607d | 0 | 1 | 0 | 2 | 0 | 1 | R | 0 | 0 | 1 | 0 | 1 | 0 |
| 607e | 0 | 2 | 0 | 2 | 0 | 1 | R | F | 0 | 1 | 0 | 1 | 0 |
| 607f | 0 | 3 | 0 | 2 | 0 | 1 | R | 1 | 0 | 1 | 0 | 1 | 1 |
| 611a | R | 1 | 0 | 1 | 0 | 1 | R | 1 | 0 | 1 | 1 | 0 | 0 |
| 611b | R | 2 | 0 | 1 | 0 | 1 | R | 1 | 0 | 1 | 1 | 0 | 0 |
| 611c | R | 3 | 0 | 1 | 0 | 1 | R | 1 | 0 | 1 | 0 | 0 | 0 |
| 611d | R | 1 | 0 | 2 | 0 | 1 | R | 1 | 0 | 1 | 0 | 1 | 0 |
| 611e | R | 2 | 0 | 2 | 0 | 1 | R | 1 | 0 | 1 | 1 | 1 | 0 |

FIG. 6

CELL-AWARE DEFECT CHARACTERIZATION BY CONSIDERING INTER-CELL TIMING

CROSS-REFERENCE TO RELATED APPLICATIONS—CLAIM OF PRIORITY

The present application claims priority to U.S. provisional Patent Application No. 63/017,534, filed on Apr. 29, 2020, for a "Cell-Aware Defect Characterization by Considering Inter-Cell Timing", which is herein incorporated by reference in its entirety.

TECHNICAL FIELD

The present disclosure relates to systems and methods for verifying the operation of an integrated circuit design and more particularly to cell-aware defect characterization by considering inter-cell timing.

BACKGROUND

Testing the operation of complex integrated circuits (ICs) is difficult due to the very large number of cells throughout the design. The use of complex ICs has been growing and indications are that it will continue to grow for the foreseeable future. Many tools currently exist for assisting in the testing of such ICs, including tools that are used to ensure that such designs meet reliability and operational requirements. One important tool that is used to assist in testing a complex IC is a cell-aware defect model. The cell-aware defect model targets defects inside standard library cells to enable better defect coverage and more accurate defect diagnosis. Cell-aware defect models have been widely adopted by the industry for designs manufactured using the latest manufacturing technologies.

SUMMARY

A method is disclosed in which a cell of an integrated circuit design is modeled with a plurality of inputs, at least one output, and at least one modeled defect. The logic state of at least one of the outputs of the model is determined based on a combination of logic states of at least one of the plurality of inputs with a first load condition imposed on at least one of the inputs upon which the state of the at least one of the outputs is based. The logic state of the at least one of the outputs of the model is determined based on the logic state of at least one of the inputs with a second load condition imposed on at least one of the inputs upon which the state of the at least one of the outputs is based. A processor determines whether the logic state of the at least one of the outputs is different with the first load condition imposed than with the second load condition imposed, when at least one of the modeled defects is present in the model for the combination of input logic states.

In addition, a system is disclosed as comprising a memory for storing whether a modeled defect in a cell of an integrated circuit can be detected with a predetermined combination of input logic states applied. In addition, the system comprises a processor, coupled to the memory for: (1) storing the determination as to whether the modeled defect can be detected; (2) modeling a cell of an integrated circuit design with a plurality of inputs and at least one output; (3) modeling the cell with at least one modeled defect; (4) determining the logic state of at least one of the outputs of the model based on a combination of a logic state of at least one of the plurality of inputs with a first load condition imposed on at least one of the inputs upon which the state of the output is based determining the logic state of at least one of the outputs of the model based on the logic state of at least one of the inputs with a second load condition imposed on at least one of the inputs upon which the state of the output is based; and (5) determining whether the logic state of the output with the second load condition imposed is different from the logic state of the output with the first load condition imposed when at least one of the modeled defects is present in the model for the combination of input logic states.

Still further, a non-transitory computer readable medium is disclosed, comprising stored instructions, which when executed by a processor, cause the processor to: (1) store the determination as to whether the modeled defect can be detected; (2) model a cell of an integrated circuit design with a plurality of inputs and at least one output; (3) model the cell with at least one modeled defect; (4) determine the logic state of at least one of the outputs of the model based on a combination of a logic state of at least one of the plurality of inputs with a first load condition imposed on at least one of the inputs upon which the state of the output is based; (5) determine the logic state of at least one of the outputs of the model based on the logic state of at least one of the inputs with a second load condition imposed on at least one of the inputs upon which the state of the output is based; and (6) determine whether the logic state of the output with the second load condition imposed is different from the logic state of the output with the first load condition imposed when at least one of the modeled defects is present in the model for the combination of input logic states.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 is an illustration of a Static Defect Detection Table.

FIG. 5 is an illustration of a DDT in accordance with the disclosed method and apparatus.

FIG. 6 is an illustration of a dynamic defect detection record used to record the behavior for each combination of logic states and arcs.

DETAILED DESCRIPTION

The disclosed method and apparatus provide an efficient and relatively accurate method and apparatus for modeling faults in cells of a complex integrated circuit (IC).

For a design with millions of standard library cells, signals applied to cell pins of each of the cells are impacted by signals of adjacent cells, resulting in factors that must be considered when attempting to model the resistive/capacitive (RC) network connected to each pin. Also, the amount of RC loading at a cell pin can depend upon the type of technology used to implement the cell. Different RC loading may lead to different waveforms at each of the input pins of the cells of the IC. These differing waveforms can have a significant impact on the behavior that results from particular types of defects in the cell.

Figure 1:
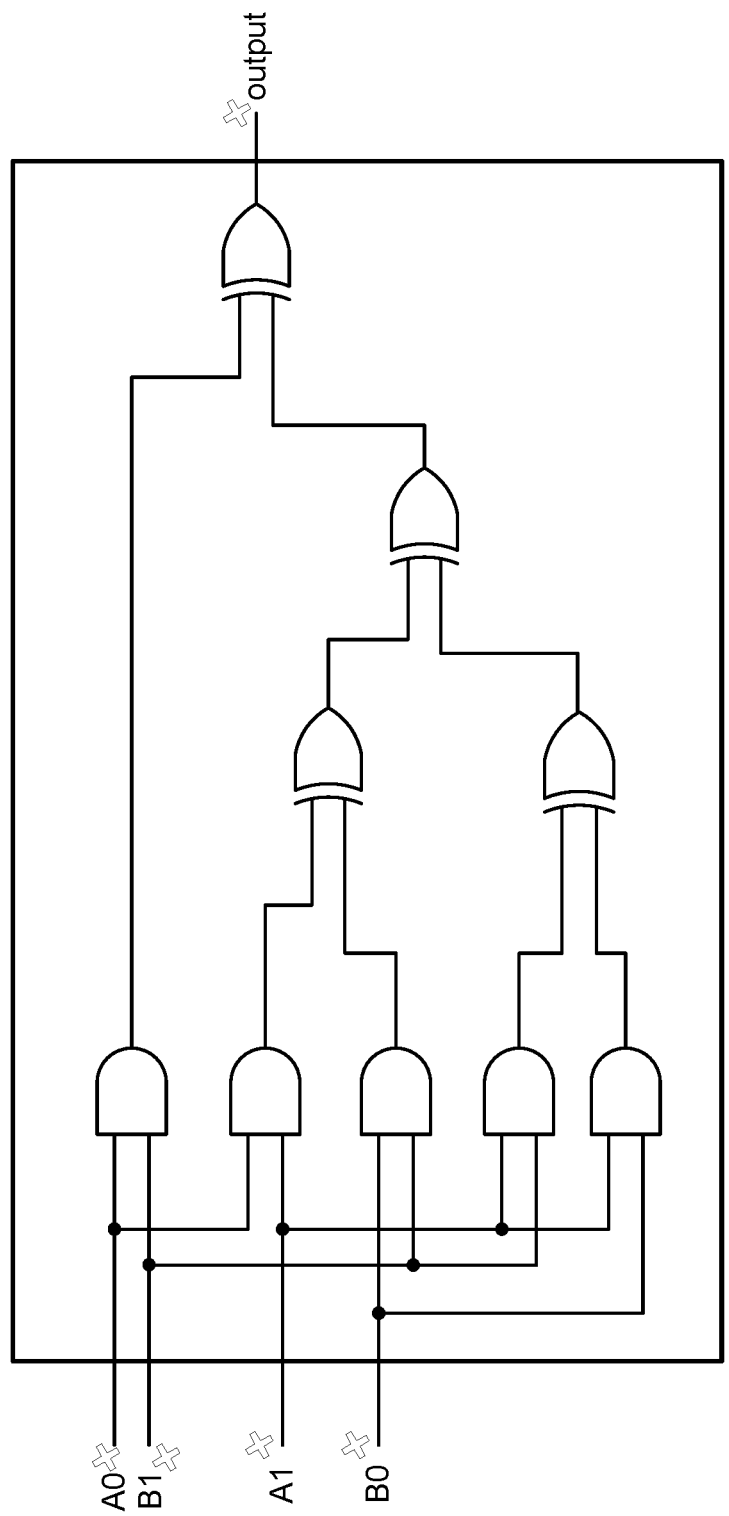
FIG. 1 is a simplified illustration of a standard library cell having four inputs and one output.

One way in which standard library cells have been tested, relies on detecting appropriate output states for each particular combination of input states that can be applied to the cell. FIG. 1 is a simplified illustration of a standard library cell having four inputs A0, A1, B0, B1 and one output, each illustrated with a red cross to indicate that they are a test point. By applying particular combinations of input logic states and observing the logic state at the output, the functionality of the cell is confirmed. Such simplistic testing is sufficient for simply cells. However, as the complexity of standard library cells increases, the ability of such simplistic methods to detect failures breaks down. In particular, it is difficult to determine the source of the failure in a complex cell merely by applying known logic states to the inputs and detecting the logic states of the outputs.

To allow for a more comprehensive analysis, a conventional cell-aware defect model is used to model the behavior of the cell under particular defect conditions. The behavior is documented in a defect detection table. The cell-aware defect model is generated for a library cell using a "cell-aware test model generation tool" (CTMGT). The CTMGT simulates many (if not all) possible input combinations of input logic states at the input pins to a particular library cell for a particular combination of defects, as well as the logic state of the output under the particular input and defect conditions in order to accurately capture the defect behavior of the cell.

Two types of defects are typically considered; static defects and dynamic defects. Static defects cause a signal to be stuck at a logic 0 state or stuck at logic 1 state, no matter what input values are applied to the inputs of the cell. Dynamic defects cause a delay in the transition of a signal from a 0 logic state to a 1 logic state (or from 1 to 0). Typically, the defect detection table (DDT) comprises a static defect detection table (S-DDT) and a dynamic defect detection table (D-DDT).

Figure 2:
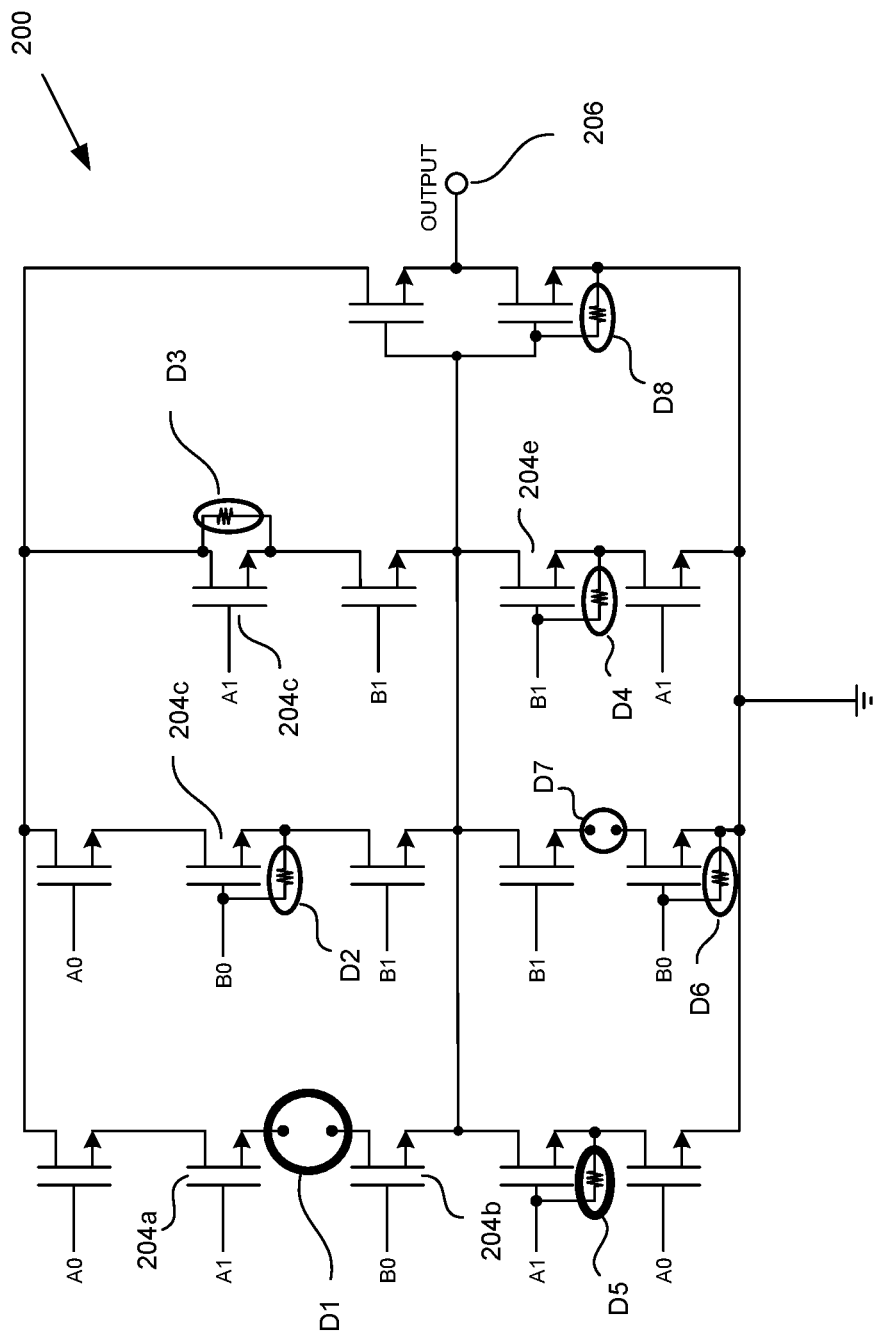
FIG. 2 is an illustration of an example of a cell for which defects have been modeled.

FIG. 2 is an illustration of an example of a cell for which defects have been modeled. For example, a first defect D1 is an open circuit between a first field effect transistor (FET) 204a and a second FET 204b. A second defect D2 is a resistive short between the gate and source of a third FET 204c. A third defect D3 is a resistive short between the gate and source of a fourth FET 204d. A fourth defect D4 is a resistive short between the drain and source of a fifth FET 204e. A set of inputs A0, A1, B0, B1 are shown, as well as an output node 206. Addition defects 202f, 202g, 202h are also shown. It should be noted that when elements shown in a figure are associated with a referenced designation having a numeric portion followed by an alphabetic portion, such as FET 204a, all elements having the same numeric portion may be referenced collectively by the numeric portion, such as FETs 204.

FIG. 3 is an illustration of a S-DDT 300. The first four columns of the S-DDT 300 indicate the combination of input logic states. A "1" in the first column labeled "A0" indicates that a signal having a logic state "1" is applied to the input A0. It should be noted that several nodes in the cell 200 may be connected to the input A0, as is the case in the example shown in the cell 200. Similarly, a "0" in the second column labeled "A1" indicates that a signal having a logic state of "0" is being applied to the input A1. This follows for the columns labeled "B0" and "B1", as well.

A "1" or "0" in the column labeled "output" indicates that the output resulting from the particular combination of input signal states without any defect in the cell. The last five columns indicate whether each particular defect can be detected (i.e., will result in a change in the resulting output) with the particular combination of input logic states. A "1" in the columns labeled "Dx", where x is equal to 1, 3, 4, 5 or 7, indicates that the associated defect can be detected. For example, a "1" in the columns labeled "D5" and "D7" in the first row indicates that the output will be a "1" (as opposed to "0" as indicated in the output column of row 1) if either the defect D5 or the defect D7 were present in the circuit and the input logic states were 0, 0, 0, 1 are applied to the inputs "A0", "A1" "B0", and "B1", respectively. Furthermore, the defects D1, D3 and D4 would not affect the state of the output (i.e., such defects could not be detected from this combination of input logic states). It should be noted that the defects D2, D6 and D8 were not modeled for the combination of input logic states and the output logic states in this table. Therefore, this table does not indicate whether such defects are detectable or not. It should also be noted that the particular logic states do not necessarily logically relate to the particular defects noted in this example, but rather the input states and the locations of the defect were not correlated to actually result in the detectability of these particular defects in the manner documented in the DDTs presented herein. These DDT values are were selected arbitrarily merely for the purpose of illustrating the way a DDT in accordance with the disclosed method and apparatus is intended to operate.

Figure 4:
FIG. 4 illustrates a D-DDT in which the defects are documented for various combinations of input logic states applied to each of the inputs and with the output having the logic level shown.

FIG. 4 illustrates a D-DDT 400 in which the defects D2, D6 and D8 are documented for various combinations of input logic states applied to each of the inputs A0, A1, B0, B1 and with the output having the logic state shown in the D-DDT 400. In the D-DDT 400, a "0" in one of the input columns indicates that the signal applied to that input is in the logic "0" state. An "R" in one of the input columns indicates that the signal applied to the corresponding input is rising from a "0" logic state to a "1" logic state. An "F" in an input column indicates that the signal applied to the associated input is falling from a logic "1" state to a logic "0" state.

Accordingly, when a defect is detected by a given input vector (i.e., set of input logic states applied to the cell input nodes), a "1" is noted in the detection table while when a defect is undetected by a given input vector, a "0" is noted in the detection table.

In addition, demand for low power consumption has pushed down the chip operating voltages, which has in turn caused significant increases in analog effects as well as process related timing variations. These effects have resulted in increases in the amount of variation in the length of a timing arc (i.e., the rise time and/or fall time of a signal at a particular node in the IC due to propagating through a particular portion of the circuit). This increase has made it more difficult to accurately detect dynamic faults, since some dynamic faults are dependent upon the particular timing along the circuits of the IC.

Accordingly, it would be advantageous to provide a system that can efficiently and more accurately model the conditions under which a fault will occur The disclosed method and apparatus presented herein provides a cell-aware fault model that takes into account the different timing (i.e., resulting waveforms) caused by inter-cell capacitance or load capacitance. By taking into consideration different instances of RC loading when modeling fault conditions, the behavior of a defect can be modeled using a more realistic model. This model can then be applied to an IC design. A range of RC values is used in the modeling of an IC design depending upon the particular fabrication technology used to fabricate the IC. Accordingly, a determination can be made as to whether a defect exhibits different "detection status" for different timing arcs (i.e., can be detected under some RC loading conditions, but not under different RC loading conditions). In cases in which it is determined that a defect is sensitive to the timing of waveforms applied to the inputs (such as might be caused by different inter-cell capacitance), a flexible detection status "x" is placed in a column of a S-DDT to indicate that the cell-aware test model has determined that the status of the defect is non-deterministic (i.e., may vary with varying RC loading on various input pins).

A cell-aware defect model targets defects inside a standard library cell and enables more effective defect modeling and so more accurate defect diagnosis. Cell-aware defect modeling captures the defect behavior in a defect detection table (DDT). Similar to the DDT previously used (such as shown in FIG. 4), the DDT used in the presently disclosed method and apparatus has several rows, each of which is associated with a particular combination of logic states for the inputs, outputs and indicates the impact of each defect within a group of defects being modeled. In some embodiments, a determination as to whether a defect is detectable can be made by determining whether the logic state of the outputs of the cell are the different when with the defect than they are without the defect.

However, in accordance with the presently disclosed method and apparatus, a cell-aware defect model for a library cell is generated using an advanced CTMGT. Several possible input combinations of the input pins are modeled. For each combination of input signals, a particular timing arc (i.e., signal rise or fall time based on load conditions on the signal) is assumed to be applied at each input. The same combination of input signal logic states (i.e., input rising, falling or at steady state) is applied, but with different timing arcs applied at each of the inputs. Applying signals with different timing arcs to those inputs that are either rising or falling allows the defect behavior under varying conditions to be more accurately captured. This is then repeated for each combination of input signal logic states. Similarly, the load conditions at the output are varied. For each combination, the logic state of the outputs are determined. In the example shown, there is only one output, but other embodiments may have a plurality of outputs. By determining whether the logic state of the outputs is different with different load conditions, the behavior of the cell can be determined for each such combination of input logic states and load conditions. Accordingly, in some embodiments, a processor will determine the logic state of at least one of the outputs of the model of the cell based on a predetermined combination of logic states of at the inputs with a first load condition imposed on at least one of the inputs upon which the state of the outputs are based. The processor then determines the logic state of the outputs of the cell model based on the logic state of at least one of the inputs with a second load condition imposed on inputs upon which the state of the outputs are based. The processor then determines whether the logic state of the at least one of the outputs is different with the first load condition imposed then with the second load condition imposed, when at least one of the defects is present in the cell model for the combination of input logic states.

Similarly, the logic state of the outputs is determined for combinations of input logic states with different load conditions applied to the outputs. That is, the processor controlling the process determines the logic state of the at least one of the outputs of the cell model based on the predetermined combination of logic states with a particular load condition imposed on one or more of the outputs. The processor then determines the logic state of the outputs of the cell model based on the predetermined combination of logic states with a different load condition imposed on the outputs. A determination is then by the processor as to whether the logic state of the outputs is different with the initial load condition imposed then with the subsequent load condition imposed, when at least one of the defects is present in the model for the combination of input logic states.

For each defect that is modeled, the models can have one of three different results for each combination of inputs logic states. The first result is that the defect modeled can be detected in all cases in which the particular combination of logic states is applied regardless of the timing arcs applied to the inputs for all output load conditions. In this case, a defect is marked with a "1" in the DDT. A second result is that the defect cannot be detected regardless of the timing arcs applied to the various inputs using this combination of logic states regardless of the load conditions on the outputs. In this case, the defect is assigned a "0" in the DDT in the row associated with this combination of input logic states. The third result is that the defect can be detected for some sets of timing arcs and/or output load conditions, but not for other sets of timing arcs and/or output load conditions. In this case, an "x" is placed in the column associated with that defect for the row associated with this combination of input signal states. This will be made clearer with the following examples.

By indicating in the DDT whether a defect is detectable under all load conditions, not detectable under any load conditions or detectable under only some load conditions, defects that might otherwise have been hard to detect or to characterize can be identified.

FIG. 5 is an illustration of a DDT 500 in accordance with the disclosed method and apparatus. As was the case for the DDT 400 shown in FIG. 4, each input is indicated at the head of a corresponding one of the columns 502 of the DDT 500. In addition, each output (there is only one in the example shown) is indicated at the head of a corresponding one of the columns 504 of the DDT 500. Still further, each defect that is modeled is indicated at the head of a corresponding one of the columns 506 of the DDT 500. The inputs, outputs and defects indicated at the head of each column in the DDT 500 are the same as those shown in, and described with respect to the DDT 400 of FIG. 4.

However, in contrast with the DDT 400 shown in FIG. 4, each column of the DDT 500 is a "merged result" from a series of modeled behaviors. A merged result is the result that merges several results, each such merged result having the same input, but a different sets of timing arcs and/or output load conditions, as will be seen from the example described below.

FIG. 6 is an illustration of a dynamic defect detection record 600 used to record the behavior for each combination of logic states and arcs. The recorded defect behavior of the dynamic defect detection record 600 is used to create the merged results shown in the DDT 500. For each defect 606, a defect entry 608 is made in association with each unique combination of input logic states 602 and input load conditions 609. In some embodiments, the dynamic defect detection record also has unique defect entries 608 associated with each of several output load conditions 604. That is, there is a unique defect entry 608 associated with the all the same values for the inputs 602 and input load conditions 609, but different values for the output load condition 604.

Looking at the first six rows of the dynamic defect detection record 600, the logic state of the inputs and outputs are held the same. That is, for each of the first six rows 607, the logic state of the input A0 is "0", the logic state of the input A1 is "0", the logic state of the input B0 is "0" and the logic state of the input B1 is "R" (rising). The output for each of the first six rows is "0". In addition to the columns that indicate the particular logic state of each input, output and the state of the defect, there are columns 609 associated with each input and a column 605 associated with the output, that indicate the load (i.e., the arc) associated with each particular input and the output. In the example shown in FIG. 6, the load is indicated by an integer number from 1 to 3 to indicate one of three distinct loads for which the defects D2, D6, D8 will be modeled. It should be noted that the load conditions can include different numbers of unique load conditions for each of the inputs and outputs. For example, there may be 3 unique load conditions 609a associated with the input A0 and five different unique load conditions 609b associated with the input A1. In addition, it should be noted that the record 600 shown in FIG. 6 shows only some of the combinations of input logic states, resulting output logic states and load conditions for each, since the number of combinations is too large to illustrate all possible combinations.

The first row 607a shows that for the particular combination of logic states applied to the inputs, the output (row 607a, column 604) will be 0 and none of the three defects D2, D6, D8 are detected when the loading condition 1 (row 607a, column 609a) is applied to the input A0, loading condition 1 (row 607a, column 609b) is applied to the input A1, loading condition 1 (row 607a, column 609c) is applied to the input B0, loading condition 1 (row 607a, column 609d) is applied to the input B1, and output loading condition 1 (row 607a, column 605) is present at the output. However, when the loading condition (row 607b, column 609a) on the input A0 is changed to loading condition 2, as shown in the second row 607b of the record 600, the defect D8 is detected, as indicated by the "1" in the D8 column 617 of the second row 607b. Accordingly, with all other conditions being the same, a change in the load condition on the input signal applied to the input A0 will change whether the defect D8 is detected. Similarly, with loading condition 3 applied to the signal at input A0 (row 607c, column 609a), the defect D8 is detected, as noted by the "1" in the third row 607c and D8 column 617. It should be noted that in the example dynamic defect detection record 600 shown, the value in the output load condition column 605 remains constant for all of the rows shown. However, the output load condition will typically be a variable, similar to the input load conditions on each input and will be varied to test the ability to detect defects under varying output load conditions.

It can be seen that the same logic state is applied to each of the inputs in the first six rows 607 of the record 600, but the loading 609a, 609b of the first two inputs A0, A1 changes in each of these rows 607. Furthermore, as the loading 609a, 609b of these two inputs changes, the particular defects 606a, 606b, 606c that are detectable changes. Since each of the first six rows 607 have the same logic states, they will be "merged" into the row 508 of the DDT 500 having the same logic state (i.e., 0, 0, 0, R, for the four inputs A0, A1, B0, B1, respectively) shown in the first row 508 of the DDT 500. The defect D2 is undetected for all the tested input and output loading conditions imposed in the first six rows 607 of the dynamic defect detection record 600. Therefore, defect entry having a value of "0" is placed in the D2 column 506a of the first row 508 of the DDT 500. Since defects D6 and D8 can be detected under some loading conditions, but not others for this combination of logic states at the inputs, a defect entry having a value of "x" is placed in the D6 and D8 columns 506b, 506c in the first row 508 (i.e., the row associated with the particular combination of input logic states 0, 0, 0, R).

Looking next at rows 611 of the record 600, the inputs have a combination of logic states R, 0, 0, R. The advanced CTMGT generates models for the defects with the loading condition for input A0 in column 609a set to a loading condition 1 in the $7^{th}$ row 611a, loading condition 2 in the $8^{th}$ row 611b, etc. The loading condition 609b for the input A1 is held to loading condition 1 for the $7^{th}$, $8^{th}$ and $9^{th}$ rows 611a-611c, but is set to loading condition 2 for the $10^{th}$ and $11^{th}$ rows 611d, 611e. In the $7^{th}$ through the eleventh rows 611, the defect D8 is not detected. However, both the defect D2 and D6 were detected in some and not in others of these rows. Therefore, upon merging the models for the combination of input states R, 0, 0, R, the defect columns 506a, 506b for the defects D2 and D6 in columns 506a, 506b are marked in row 510 the DDT 500 with an "x" and the defect D8 in column 506c is marked with a "0" in row 510, indicating that with the combination of input logic states shown in the second row of the DDT, and under some but not other load conditions, the defect D2 and D6 is detected. However, the defect D8 is not detected under any load conditions for this particular combination of input logic states.

Looking now at the third row 512 of the DDT 500 in which the combination of input logic states are 0, 0, R, R shown in columns 502, it can be seen that the defect D2 and D6 are never detected under any load conditions, while the defect D8 is always detected under any load conditions, as indicated by a "0" in the D2 and D6 columns 506a, 506b of the third row 512 of the DDT 500 and by a "1" in the D8 column 506c of the third row 512 of the DDT 500.

In some embodiments, the record 600 is maintained. However, in other embodiments, the record 600 is not explicitly created, but rather the results are compiled in order to complete the DDT 500. That is, the illustration of the generated record 600 is merely for illustrative purposes in some embodiments, but may be expressly generated in other embodiments.

In some embodiments, the particular loading conditions that determine the arc at the inputs and outputs can be determined based on the results of static timing analysis (STA) and dynamic timing analysis (DTA). The methods used for performing such timing analysis are well known in the art. That is, by using a range of slew rates that result from potential capacitive loads to characterize particular nature of the input signals that might be possibly applied to an input or that might occur as an output signals in a design under test, the particular load conditions under which the advanced CTMGT generates the merged values in the DDT can be modeled. Alternatively, models that indicate the range of reactive loads (e.g., capacitive loading) can be used to determine a range of slew rates that should be used by the advanced CTMGT to generate the range of models for each combination of input logic states.

Figure 7:
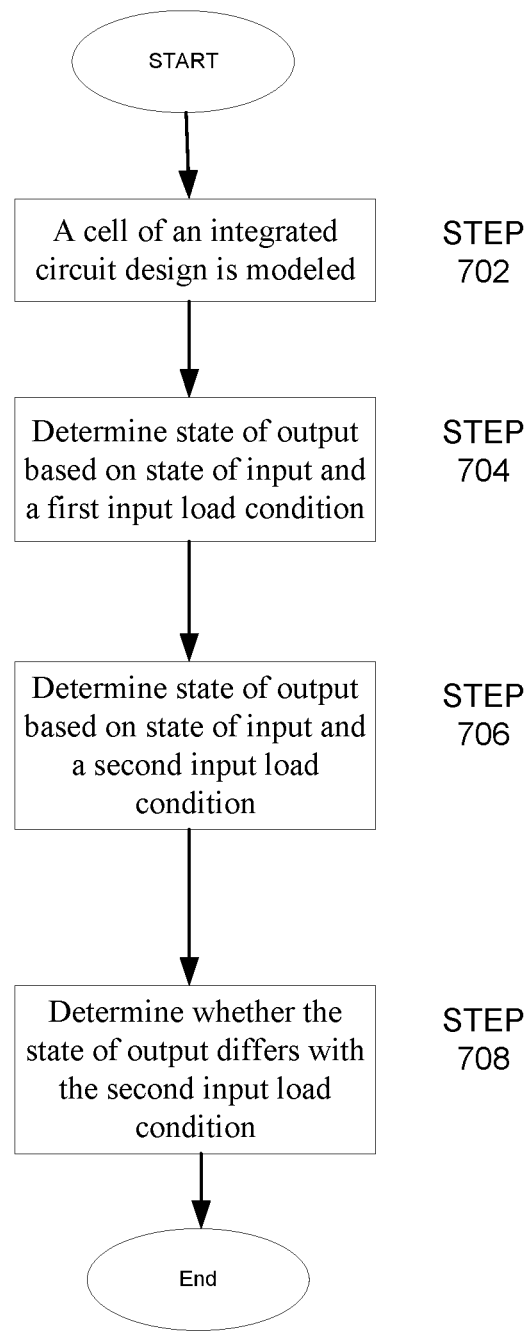
FIG. 7 is a flowchart of one embodiment of the disclosed method.

FIG. 7 is a flowchart of one embodiment of the disclosed method. Initially, a cell of an integrated circuit design is modeled with a plurality of inputs, at least one output, and at least one modeled defect (STEP 702). Next, a determination is made regarding the logic state of at least one of the outputs of the model based on a combination of logic states of at least one of the inputs with a first load condition imposed on the inputs that determine the state of the outputs (STEP 704). Next, the logic state of at least one of the outputs is determined based on the logic state of at least one of the inputs with a second load condition imposed on at least one of the inputs (STEP 706). Finally, a processor determines whether the logic state of the at least one of the outputs is different with the first load condition imposed on the inputs then than with the second load condition imposed, when at least one of the modeled defects is present in the model for the combination of input logic states (STEP 708).

Apparatus for Implementing the Disclosed Method

Figure 8:
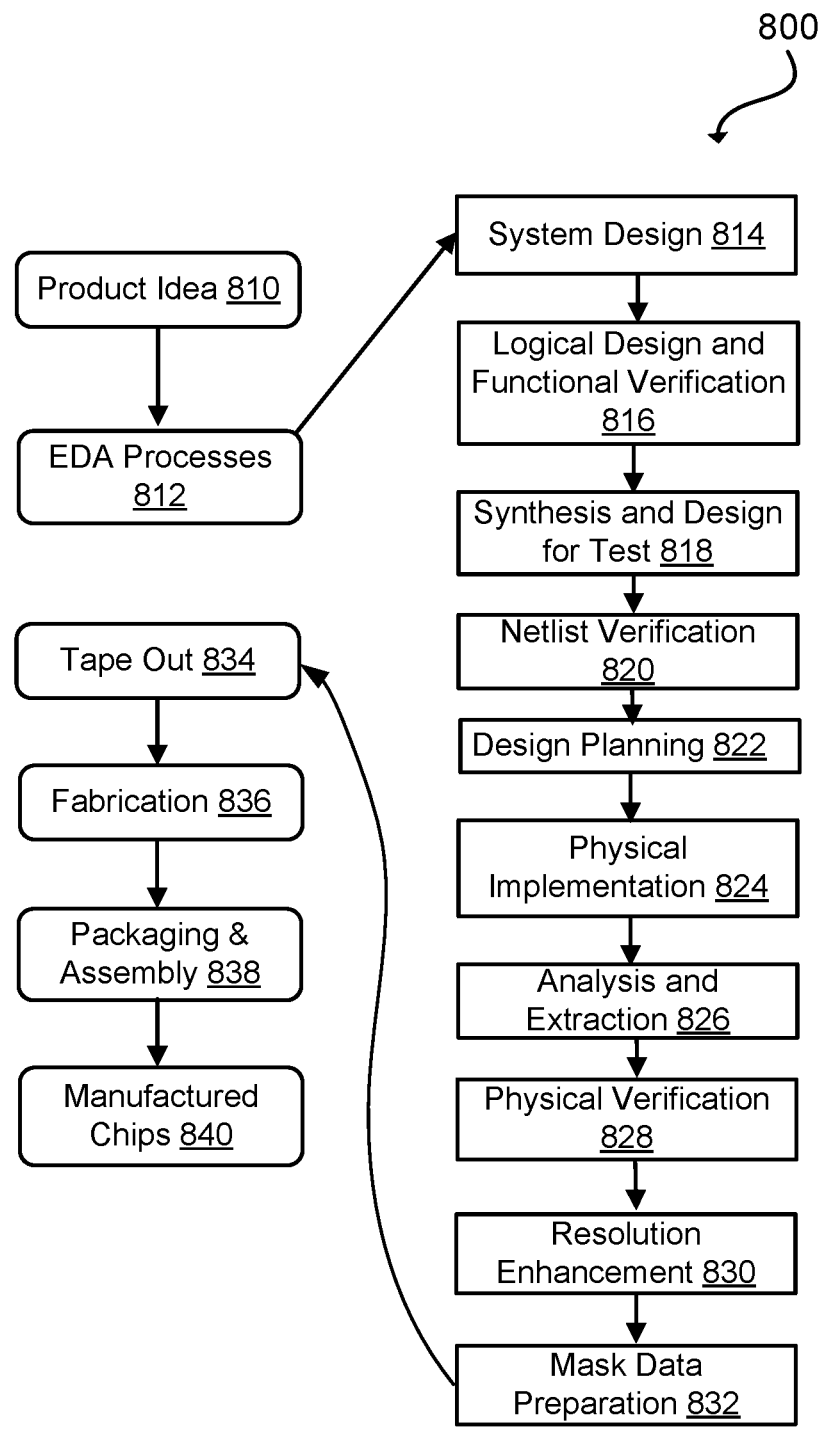
FIG. 8 illustrates an example set of processes used during the design, verification, and fabrication of an article of manufacture such as an integrated circuit to transform and verify design data and instructions that represent the integrated circuit.

FIG. 8 illustrates an example set of processes 800 used during the design, verification, and fabrication of an article of manufacture, such as an integrated circuit, to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer. The information is transformed to create an article of manufacture that uses a set of EDA processes 812. When finalized, the design is taped-out 834 and artwork (e.g., geometric patterns) for the integrated circuit is sent to a fabrication facility to manufacture a mask set. The mask set is then used to manufacture an integrated circuit. After tape-out, a semiconductor die is fabricated 836 and packaging and assembly processes 838 are performed to produce a finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 814, functionality of an integrated circuit to be manufactured is specified. The design may be optimized for desired characteristics, such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used throughout this disclosure, the term "cell" specifies a set of transistors, other components, and interconnections that provide a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
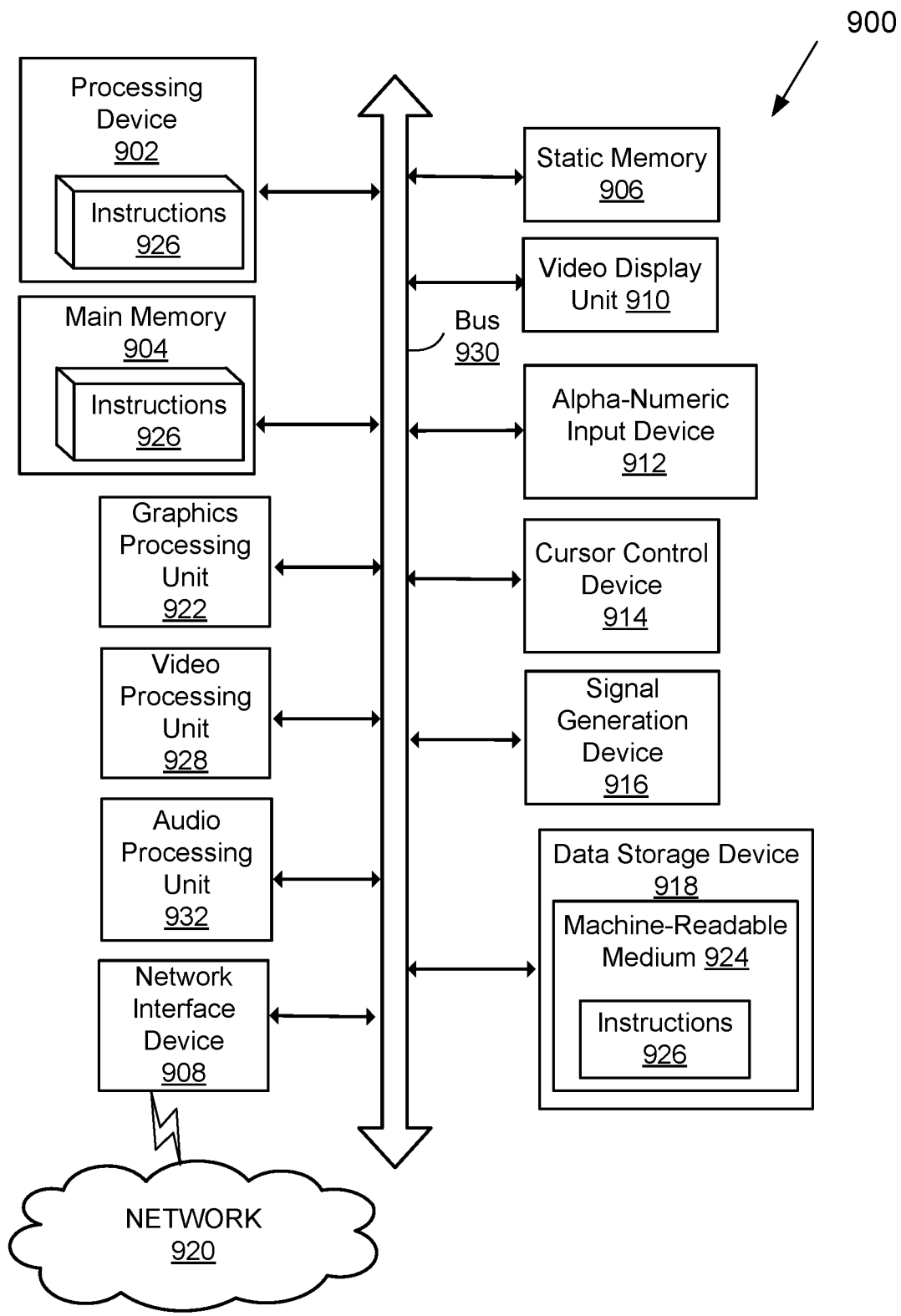
FIG. 9 illustrates an example machine of a computer system 900 within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   modeling a cell of an integrated circuit design with a plurality of inputs, at least one output having a logic state, and at least one modeled defect;
   determining the logic state of at least one of the outputs of the model based on a combination of logic states of at least one of the plurality of inputs with a first load condition imposed on at least one of the inputs upon which the state of the at least one of the outputs is based;
   determining the logic state of the at least one of the outputs of the model based on the logic state of at least one of the inputs with a second load condition imposed on at least one of the inputs upon which the state of the at least one of the outputs is based; and
   determining, by a processor, whether the logic state of the at least one of the outputs is different with the first load condition imposed than with the second load condition imposed, when at least one of the modeled defects is present in the model for the combination of input logic states.

2. The method of claim 1, further comprising:
   determining the logic state of the at least one of the outputs of the model based on the combination of logic states with a third load condition imposed on the at least one output;
   determining the logic state of the at least one of the outputs of the model based on the combination of logic states with a fourth load condition imposed on the at least one output; and
   determining whether the logic state of the at least one of the outputs is different with the third load condition imposed then with the fourth load condition imposed, when at least one of the modeled defects is present in the model for the combination of input logic states.

3. The method of claim 1, further determining from the logic state of the at least one output, whether the modeled defect is detectable.

4. The method of claim 3, further determining from the logic state of the plurality of inputs, and the logic state of the at least output, whether the modeled defect is detectable.

5. The method of claim 4, further including:
   modeling the cell with the plurality of inputs and the at least one output and without the at least one modeled defect;
   for the model with the modeled defect, determining the logic state of at least one of the outputs of the model based on the predetermined combination of logic states of at least one of the plurality of inputs;
   for the model without the modeled defect, determining the logic state of at least one of the outputs of the model based on the predetermined combination of logic states of at least one of the plurality of inputs; and
   determining whether the modeled defect is detectable based on the whether the logic state is the same for the at least one output for the model with the modeled defect and for the at least one output for the model without the modeled defect.

6. The method of claim 1, further comprising indicating in a defect detection table whether the modeled defect is:
   detectable under all input load conditions;
   detectable under some input load conditions, but not under other load conditions; or
   not detectable under any of the input load conditions.

7. The method of claim 6, further comprising indicating in a dynamic defect detection record whether the modeled defect is detectable, the dynamic defect detection record having a defect entry for each unique combination of input logic states, input load conditions and output load conditions.

8. A system comprising:
   a memory for storing whether a modeled defect in a cell of an integrated circuit can be detected with a predetermined combination of input logic states applied;
   a processor, coupled to the memory for:
   storing the determination as to whether the modeled defect can be detected;
   modeling a cell of an integrated circuit design with a plurality of inputs and at least one output having a logic state;
   modeling the cell with at least one modeled defect;
   determining the logic state of at least one of the outputs of the model based on a combination of a logic state of at least one of the plurality of inputs with a first load condition imposed on at least one of the inputs upon which the state of the output is based;
   determining the logic state of at least one of the outputs of the model based on the logic state of at least one of the inputs with a second load condition imposed on at least one of the inputs upon which the state of the output is based;
   determining whether the logic state of the output with the second load condition imposed is different from the logic state of the output with the first load condition imposed when at least one of the modeled defects is present in the model for the combination of input logic states.

9. The system of claim 8, wherein the process is further for:
   determining the logic state of the at least one of the outputs of the model based on the combination of logic states with a third load condition imposed on the at least one output;
   determining the logic state of the at least one of the outputs of the model based on the combination of logic states with a fourth load condition imposed on the at least one output; and
   determining whether the logic state of the at least one of the outputs is different with the third load condition imposed then with the fourth load condition imposed, when at least one of the modeled defects is present in the model for the combination of input logic states.

10. The system of claim 8, in which the processor is further for determining from the logic state of the at least one output, whether the modeled defect is detectable.

11. The system of claim 10, the processor is further for determining from the logic state of the plurality of inputs, and the logic state of the at least output, whether the modeled defect is detectable.

12. The system of claim 11, in which the processor is further for:
   modeling the cell with the plurality of inputs and the at least one output and without the at least one modeled defect;
   for the model with the modeled defect, determining the logic state of at least one of the outputs of the model based on the predetermined combination of logic states of at least one of the plurality of inputs;
   for the model without the modeled defect, determining the logic state of at least one of the outputs of the model based on the predetermined combination of logic states of at least one of the plurality of inputs; and
   determining whether the modeled defect is detectable based on the whether the logic state is the same for the at least one output for the model with the modeled defect and for the at least one output for the model without the modeled defect.

13. The System of claim 8, wherein the processor is further for indicating in a defect detection table whether the modeled defect is:
   detectable under all input load conditions;
   detectable under some input load conditions, but not under other load conditions; or
   not detectable under any of the input load conditions.

14. The method of claim 13, where the processor is further for indicating in a dynamic defect detection record whether the modeled defect is detectable, the dynamic defect detection record having a defect entry for each unique combination of input logic states, input load conditions and output load conditions.

15. A non-transitory computer readable medium comprising stored instructions, which when executed by a processor, cause the processor to:
   store the determination as to whether the modeled defect can be detected;
   model a cell of an integrated circuit design with a plurality of inputs and at least one output having a logic state;
   model the cell with at least one modeled defect;
   determine the logic state of at least one of the outputs of the model based on a combination of a logic state of at least one of the plurality of inputs with a first load condition imposed on at least one of the inputs upon which the state of the output is based;
   determine the logic state of at least one of the outputs of the model based on the logic state of at least one of the inputs with a second load condition imposed on at least one of the inputs upon which the state of the output is based;
   determine whether the logic state of the output with the second load condition imposed is different from the logic state of the output with the first load condition imposed when at least one of the modeled defects is present in the model for the combination of input logic states.

16. The non-transitory computer readable medium of claim 15, the instructions further causing the process to:
   determine the logic state of the at least one of the outputs of the model based on the combination of logic states with a third load condition imposed on the at least one output;
   determine the logic state of the at least one of the outputs of the model based on the combination of logic states with a fourth load condition imposed on the at least one output; and
   determine whether the logic state of the at least one of the outputs is different with the third load condition imposed then with the fourth load condition imposed, when at least one of the modeled defects is present in the model for the combination of input logic states.

17. The non-transitory computer readable medium of claim 15, the instructions further causing the processor to determine from the logic state of the at least one output, whether the modeled defect is detectable.

18. The non-transitory computer readable medium of claim 17, the instructions further causing the processor to determine from the logic state of the plurality of inputs, and the logic state of the at least output, whether the modeled defect is detectable.

19. The non-transitory computer readable medium of claim 18, the instructions further causing the processor to:
   model the cell with the plurality of inputs and the at least one output and without the at least one modeled defect;
   for the model with the modeled defect, determine the logic state of at least one of the outputs of the model based on the predetermined combination of logic states of at least one of the plurality of inputs;
   for the model without the modeled defect, determine the logic state of at least one of the outputs of the model based on the predetermined combination of logic states of at least one of the plurality of inputs; and
   determine whether the modeled defect is detectable based on the whether the logic state is the same for the at least one output for the model with the modeled defect and for the at least one output for the model without the modeled defect.

20. The non-transitory computer readable medium of claim 19, the instructions further causing the processor to indicate in a defect detection table whether the modeled defect is:
   detectable under all input load conditions;
   detectable under some input load conditions, but not under other load conditions; or
   not detectable under any of the input load conditions.

* * * * *